United States Patent [19]

Kleinschmit et al.

[11] 4,286,990
[45] Sep. 1, 1981

[54] TEMPERATURE STABILIZED, PYROGENICALLY PRODUCED ALUMINUM OXIDE-MIXED OXIDE, THE PROCESS FOR ITS PRODUCTION AND USE

[75] Inventors: Peter Kleinschmit, Hanau; Rudolf Schwarz, Alzenau, both of Fed. Rep. of Germany

[73] Assignee: Degussa Aktiengesellschaft, Frankfurt, Fed. Rep. of Germany

[21] Appl. No.: 174,342

[22] Filed: Jul. 31, 1980

[30] Foreign Application Priority Data

Aug. 3, 1979 [DE] Fed. Rep. of Germany ....... 2931585

[51] Int. Cl.³ .............................................. C04B 35/10
[52] U.S. Cl. ...................................... 106/73.4; 106/65
[58] Field of Search ................................ 106/73.4, 65

[56] References Cited

U.S. PATENT DOCUMENTS

| 3,784,388 | 1/1974 | King et al. ........................ 106/73.4 |
| 3,865,599 | 2/1975 | Mansmann et al. ................ 106/73.4 |
| 3,989,783 | 11/1976 | McGee ............................. 106/73.4 |
| 4,028,453 | 6/1977 | Miller et al. ........................ 106/73.4 |
| 4,040,998 | 8/1977 | Nemeth ............................. 106/73.4 |
| 4,094,690 | 6/1978 | Morton ............................. 106/73.4 |

Primary Examiner—O. R. Vertiz
Assistant Examiner—Mark Bell
Attorney, Agent, or Firm—Cushman, Darby & Cushman

[57]  ABSTRACT

There is provided temperature stabilized pyrogenically produced aluminum oxide-mixed oxide having a BET surface area of 50 to 200 m²/g which contains 0.5 to 20 weight % silicon dioxide as a constituent thereof. Because of the silicon dioxide constituent the aluminum oxide does not change into the $\alpha$-$Al_2O_3$ phase until 1350° C. The temperature stabilized aluminum oxide-mixed oxide is suitable for the production of thermal insulation compositions.

16 Claims, 3 Drawing Figures

TEMPERATURE STABILIZED, PYROGENICALLY PRODUCED ALUMINUM OXIDE-MIXED OXIDE, THE PROCESS FOR ITS PRODUCTION AND USE

SUMMARY OF THE INVENTION

The present invention is directed to a temperature stabilized, pyrogenically produced aluminum oxide-mixed oxide having a BET surface area of 50 to 200 m$^2$/g which contains as a constituent of the mixed oxide 0.5 to 20 weight % silicon dioxide (silica).

In a preferred form of the invention the aluminum oxide-mixed oxide contains 0.6 to 14.5 weight % silicon dioxide.

The aluminum oxide-mixed oxide can be heated up to 1325° C. without a phase change into $\alpha Al_2O_3$ taking place while in contrast non-stabilized $Al_2O_3$ already rearranges into the alpha modification between 1175° and 1200° C.

A further purpose of the invention is the development of a process for the production of temperature stabilized aluminum oxide-mixed oxide having a BET surface area of 50 to 200 m$^2$/g which contains 0.5 to 20 weight % silicon dioxide as a constituent of the mixed oxide which is characterized by vaporizing water free aluminum chloride, supplying it together with air into a mixing chamber of a known burner, mixing it there with hydrogen and silicon tetrachloride in such ratio that the correspondingly composed alumnium oxide-mixed oxide results, burning the 4-component mixture in a reaction chamber, then separating the solid aluminum oxide-mixed oxide from the gaseous reaction products and, in a given case, freeing the solid aluminum oxide-mixed oxide from adhering hydrogen chloride by heating in moist air.

Generally the ratio of aluminum chloride to air is 0.25 to 0.72 kg of aluminum chloride to to 1 Nm$^3$ of air, preferably 0.45 to 0.52 kg of aluminum chloride to 0.9 to 1.1 Nm$^3$ air.

Generally the ratio of hydrogen to the total of aluminum chloride and silicon tetrachloride is 0.8 to 1.5 Nm$^3$ of hydrogen to 2.7 to 3.2 kg of aluminum chloride and silicon tetrachloride, preferably 0.9 to 1.1 Nm$^3$ of hydrogen to 2.8 to 3.0 kg of aluminum chloride and silicon tetrachloride.

The temperature stabilized aluminum oxide-mixed oxide is useful in the production of thermal insulating materials and mixtures.

Unless otherwise indicated all parts and percentages are by weight.

The composition can comprise, consist essentially of or consist of the stated materials. The process can comprise, consist essentially of or consist of the stated steps with the stated materials.

The invention will be further explained in connection with the following examples:

DETAILED DESCRIPTION

EXAMPLE 1

(Comparison Example For Undoped Aluminum Oxide)

There were supplied to the mixing chamber of a burner of known type per hour 4 kg of water free aluminum chloride together with 8.35 Nm$^3$ of air. There were simultaneously led into the mixing chamber 1.4 m$^3$/h of hydrogen. The vapor/gas mixture flowed out of the burner orifice with a velocity of about 40 m/sec and burned in a reaction chamber. Then the reaction product was cooled to about 130° C., the aluminum oxide formed with a primary particle size of 7 nm was separated in a cyclone or a filter of known construction and in a given case subsequently deacidified.* The deposited $\delta$-$Al_2O_3$ by annealing between 1175° and 1200° C. changed with great enlargement of the primary particle diameter ($>$100 nm) into the $\alpha$-modification. Thereby the bulk density of the material increased about 6 times from 55 g/l to 323 g/l. While the unannealed non-changed starting material in loose bulk with a load of 15 g/cm$^2$ has a thermal conductivity of 1.6$\times$10$^{-2}$ w/m$\times$°K. (watts/meters$\times$°Kelvin) determined according to DIN 52616 (German Industrial Standard 52616) after the annealing up to 1200° C., i.e. after the phase change, it has a conductivity of 13.4$\times$10$^{-2}$ w/m$\times$°K. and consequently was no longer usable as thermal insulation.

*with moist air at the temperature of 600° C.

Figure 1:
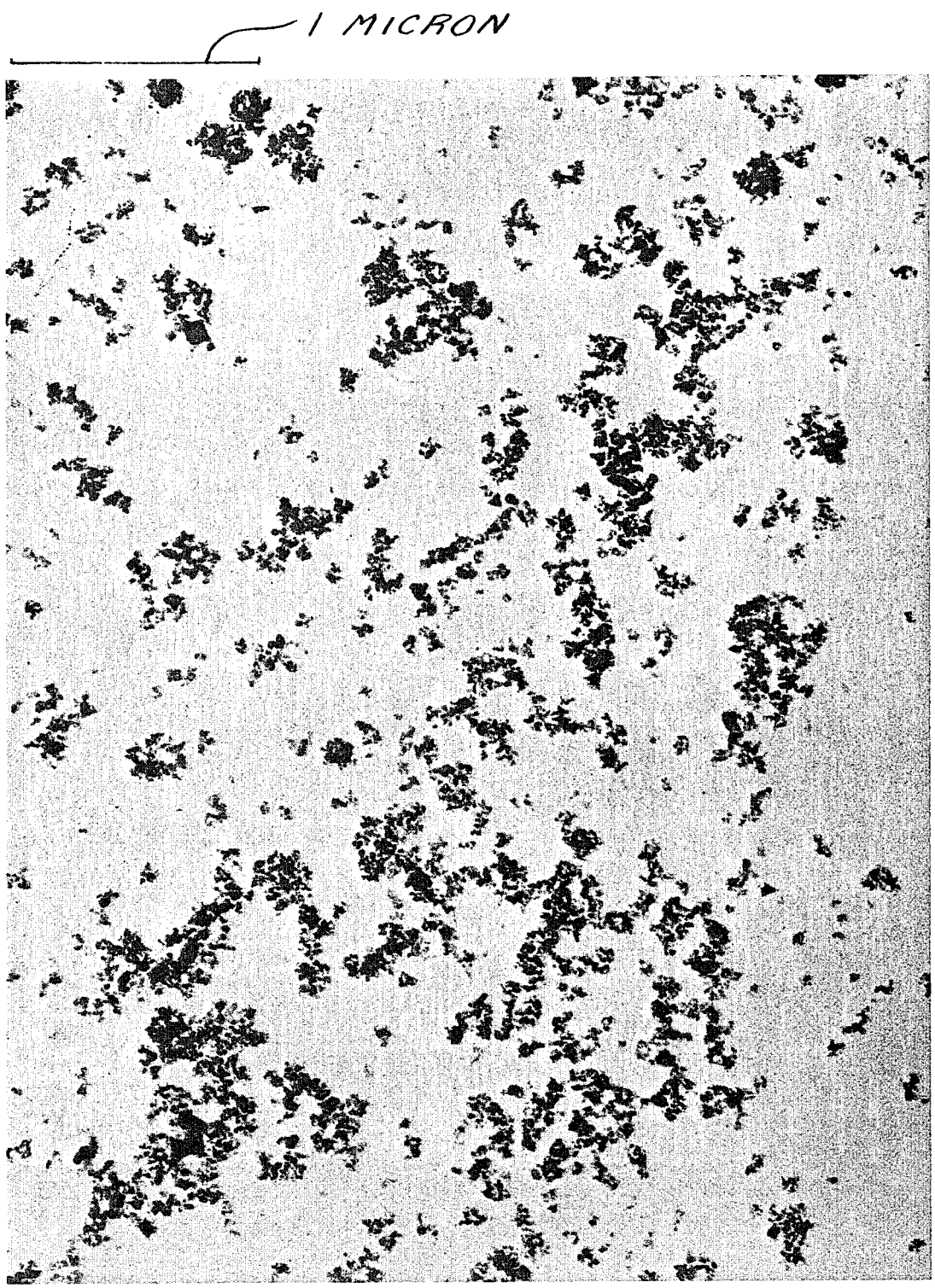
FIG. 1 is a microphotograph of an undoped aluminum oxide annealed at 1175° C.
Figure 2:
FIG. 2 is a microphotograph of the undoped aluminum oxide annealed at 1200° C.

FIG. 1 is a microphotograph showing the product at 1175° C. and FIG. 2 is a microphotograph showing the enlarged product obtained by annealing at 1200° C.

EXAMPLE 2

The procedure was the same as in Example 1 but there were additionally introduced into the mixing chamber 100 g/h of silicon tetrachloride vapor. The separated aluminum oxide-mixed oxide after the deposition had a SiO$_2$ content of 2.5%, a specific surface area of 150 m$^2$/g and an average particle diameter of 7 nm. In the annealing this product changed into the $\alpha$-modification or Silimanite between 1325° and 1350° C. with substantial loss of the specific surface area ($>$10 m$^2$/g) and increased particle size. The bulk density before the annealing was 53 m$^2$/g.

The adjustment of the stability with the annealing is relatively simple with the aluminum oxide-mixed oxide and involves little expense because the crystal phase changes within a span of 25° C., along with a spontaneous collapse of the BET surface area and a sharp increase of the particle size.

The product which was phase stabilized by doping with 2.5% of silicon dioxide in the described manner also after annealing for several hours even to above 1300° C. had a relatively slightly changed bulk density of 98 g/l. Its thermal conductivity in loos bulk form and a load of 15 g/cm$^2$ for example after a 5 hour annealing at 1300° C. only amounted to 2.6$\times$10$^{-2}$ w/m$\times$°K., through which it is clear that in this temperature range it is still outstandingly suited as a thermal insulating material or for the production of heat insulating mixtures.

Figure 3:
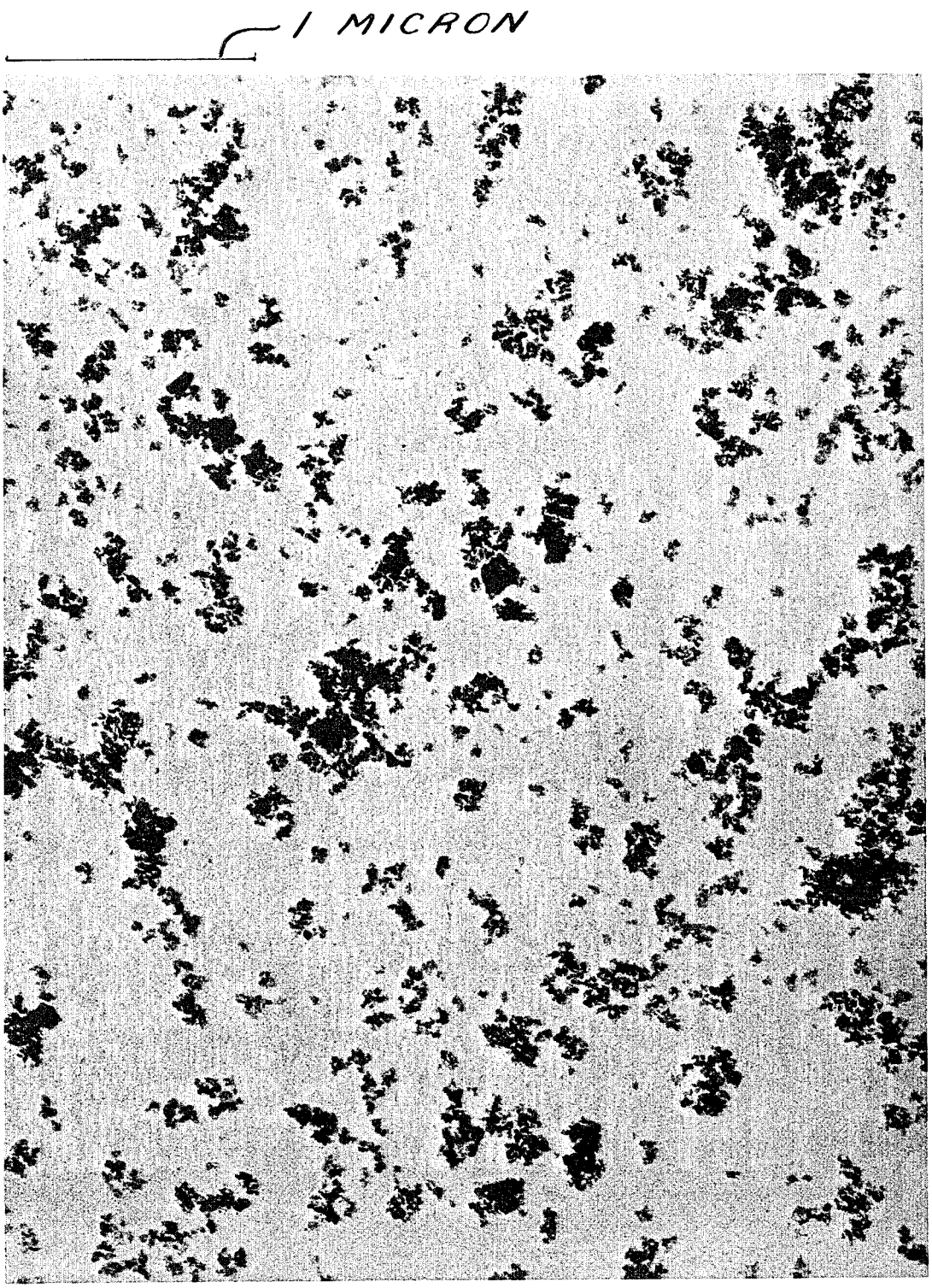
FIG. 3 is a microphotograph of the silicon dioxide doped aluminum oxide of the invention annealed at 1300° C.

FIG. 3 is a microphotograph showing the product annealed at 1300° C.

The entire disclosure of German priority application P2931585.3-41 is hereby incorporated by reference.

What is claimed is:

1. Temperature stabilized, pyrogenically produced aluminum oxide-silicon dioxide mixed oxide having a BET surface area of 50 to 200 m$^2$/g, the silicon dioxide being 0.5 to 20 weight % of the mixed oxide, the balance of the mixed oxide consisting essentially of aluminum oxide.

2. A mixed oxide according to claim 1 wherein the aluminum oxide is in the δ-form and is stabilized against transformation to the α-form up to a temperature of at least 1300° C.

3. A mixed oxide according to claim 2 containing 0.6 to 14.5 weight % of silicon dioxide.

4. A mixed oxide according to claim 3 containing about 2.5 weight % silicon dioxide.

5. A mixed oxide according to claim 4 having a specific surface area of about 150 m$^2$/g and an average particle diameter of about 7 nm.

6. A mixed oxide according to claim 5 having a thermal conductivity of about $1.6 \times 10^{-2}$ W/m×°K. and which is capable on heating to 1300° C. for 5 hours of maintaining its thermal conductivity at not over about $2.6 \times 10^{-2}$ W/m×°K. at a load of 15 g/cm.

7. A process of preparing the product of claim 2 comprising vaporizing aluminum trichloride, supplying it with air to the mixing chamber of a burner, also supplying to the mixing chamber hydrogen and silicon tetrachloride in a ratio to give the aluminum oxide-silicon dioxide mixed oxide containing 0.5 to 20 weight % silicon dioxide, burning the 4-component mixture in a reaction chamber and separating the solid aluminum oxide-silicon dioxide from the gaseous reaction products.

8. A process according to claim 7 including the step of heating the solid aluminum oxide-silicon dioxide mixed oxide in moist air to remove adhering hydrogen chloride.

9. A process according to claim 7 wherein the ratio of aluminum chloride to air is 0.25 to 0.72 kg of aluminum chloride to 1 Nm$^3$ of air and the ratio of hydrogen to the total of aluminum chloride and silicon tetrachloride is 0.8 to 1.5 Nm$^3$ of hydrogen to 2.7 to 3.2 kg of aluminum chloride and silicon tetrachloride.

10. A process according to claim 7 wherein the ratio of aluminum chloride to air is 0.45 to 0.52 kg of aluminum chloride to 0.9 to 1.1 Nm$^3$ and the ratio of hydrogen to the total of aluminum chloride and silicon tetrachloride is 0.9 to 1.1 Nm$^3$ of hydrogen to 2.8 to 3.0 kg of aluminum chloride and silicon tetrachloride.

11. A process according to claim 10 wherein the solid aluminum oxide-silicon dioxide is separated from the gaseous reaction products in a cyclone or by a filter.

12. A process according to claim 11 wherein the separation is in a cyclone.

13. A process according to claim 11 wherein the separation is by a filter.

14. A process according to claim 9 wherein the solid aluminum oxide-silicon dioxide is separated from the gaseous reaction products in a cyclone or by a filter.

15. A mixed oxide according to claim 1 consisting of aluminum oxide and silicon dioxide.

16. A mixed oxide according to claim 1 in the form of particles.

* * * * *